Oct. 25, 1949.   J. McBREEN   2,485,899
BRUSH OR RUBBING DEVICE
Filed Oct. 9, 1948
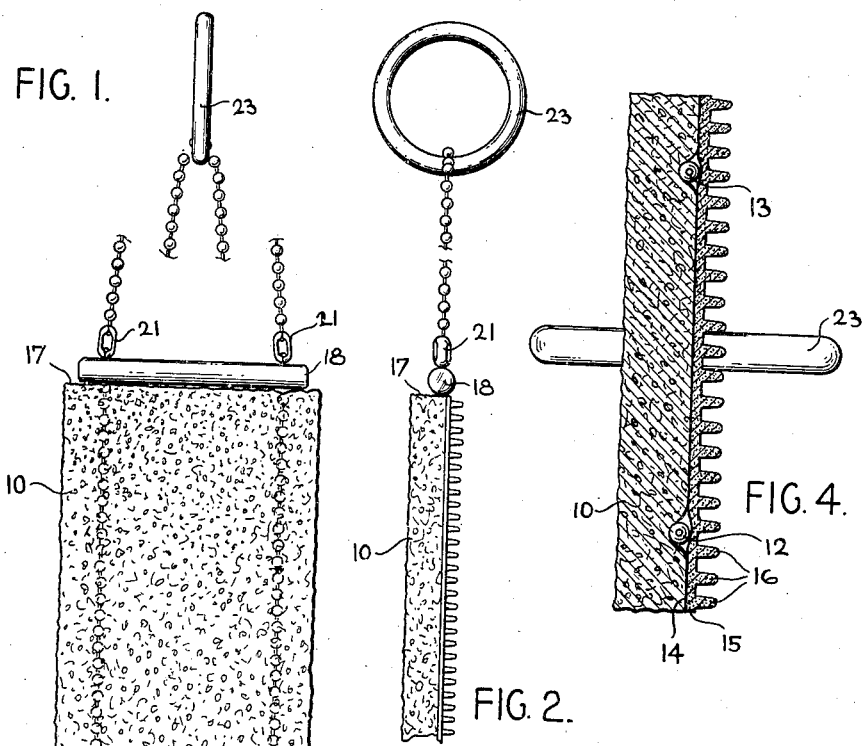
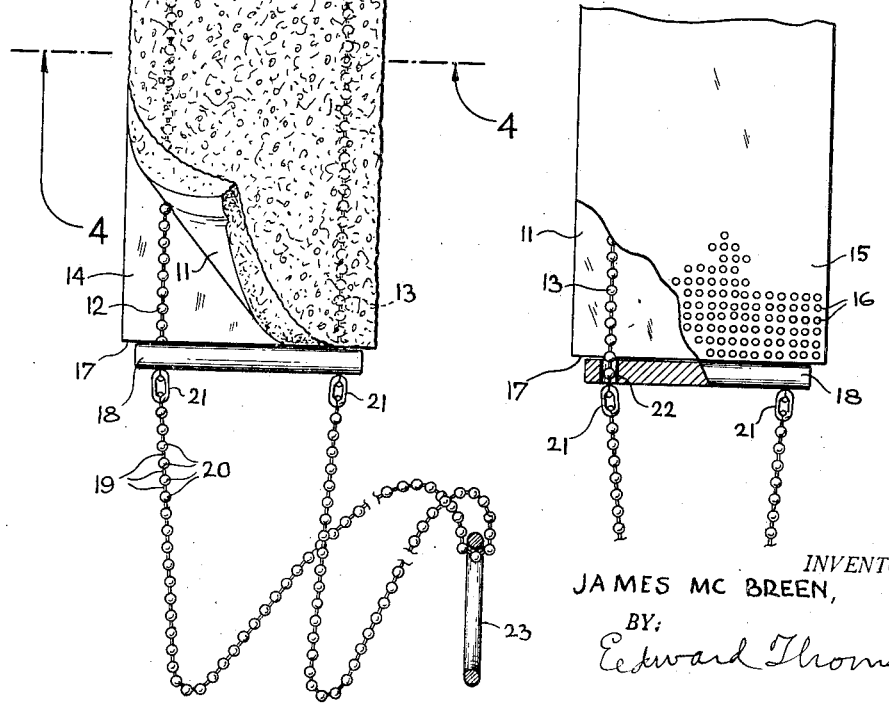
INVENTOR:
JAMES MC BREEN,
BY:
Edward Thomas
ATTORNEY Patented Oct. 25, 1949

2,485,899

UNITED STATES PATENT OFFICE 2,485,899

BRUSH OR RUBBING DEVICE

James McBreen, Albany, N. Y.

Application October 9, 1948, Serial No. 53,610

1 Claim. (Cl. 128—62)

This invention relates to a brush or rubbing device and is herein illustrated in some detail in the form of a two-faced flexible rubbing device adapted to serve in bathing or massage.

In the form shown a rubber sponge surface carries on its back an array of short resilient pillars which serve as thick bristle-like rubbing elements, so that the device offers alternative types of surfaces for a back washer, for example.

In the form shown the device includes a pulling device, such as a pair of cords, shown as chains ending in pull handles and passing through the rubber structure, say between the backings of the sponge and pillar surfaces.

The chains may consist of links of headed short lengths of wire united by nearly closed smooth metal spheres, so that no projecting points can scratch the skin of a user.

It is found that the usual relatively smooth backs of the two faces of rubber material are adequately held united by some commercial types of rubber cement.

To prevent the rubber structure from sliding along the chains a bar is shown at each end of the rubber structure, and each bar is blocked against being pushed along the chains by an abutment on each chain.

It is found that many materials are too brittle to be used as such bars, or as handles for the ends of the chains but that the plastic used for baby teething rings makes almost non-breakable handles.

Other features and advantages will hereinafter appear.

In the accompanying drawings:

Fig. 1 shows one form of the invention with dimensions modified for better illustration.

Fig. 2 is a fragmentary vertical section.

Fig. 3 shows a fragment of the back partly broken away.

Fig. 4 is an enlarged cross-section on the line 4—4 of Fig. 1.

In the form shown the rectangular layer of rubber sponge 10 of a usual commercial form having the usual roughly smooth back 11 was laid face down on a flat surface and covered with suitable commercial rubber cement.

On this were laid a pair of flexible connectors, shown as nickel-plated brass chains 12, 13 near each edge, but spaced inward from the edge, and then there was laid on the cement-covered sponge back 11 the similarly cement-covered roughly smooth rectangular back 14 of a sheet of rubber 15 with upstanding short pillars 16 forming a sort of brush.

It was found that several commercially available rubber cements hold the rubber surfaces so firmly together as to answer any ordinary purpose or withstand use, though the surfaces may be vulcanized together.

Thus the two rubber surfaces hold the chains 12, 13 concealed.

Each chain 12, 13 where it emerges from the ends 17 of the rubber structure is shown as passing through a cross-bar 18 of the above named plastic or other material non-corroding in soap and water and not easily shattered if hit against a bathroom tile or tub. Thus if the rubber structure slides on the chains it is blocked by heaping up against a cross bar 18.

The chains 12, 13 are found very satisfactory if made of very short lengths of wire 19 held at each end, as by being headed, within a nearly closed globe 20 of thin nickel-plated brass. Thus there is no projecting point or edge with a pin in the chain which might cut or scratch a user.

Just outside each cross bar 18 each chain is interrupted by an enlarged link 21 of a size unable to go through the hole 22 through which the chain passes in the cross bar 18. Each link 21 is shown as embracing two adjacent globes 20, each lying against a rounded interior of its link 21, which is closed around it under bead chain Patent No. 1,692,640.

In the form shown each chain 12, 13 is extended in a loop as a continuation of the other chain, passing through a suitable handle as a rung 23 of the same material as the cross bar 18.

It is convenient to have the chain links of such length that the 2-inch rings 23 run in them at about 11 inches from the cross-bar 18

A convenient size of rubber sponge is 12 by 4 inches, and the pillars 16 are satisfactory if $\frac{3}{16}$ inch high and spaced about 7 to the inch each way, and about $\frac{1}{16}$ inch diameter.

Highly effective color effects have been obtained by combining a lilac pink pillar-bearing sheet 15 with a green or brown sponge sheet 10, and light pink bars 18 and rings 23.

The device is well adapted to wash and massage a user's back in the usual shower bath, as well as adapted for other uses.

Having thus described one embodiment of the invention in some detail, what is claimed is:

A combined brush and sponge device, comprising a rectangular sheet of sponge rubber several times as long as it is wide and having a washing face and a smooth back, a second rubber sheet of the same size having a bristle face and a smooth back, spaced link chains imbedded lengthwise of the sheets between the smooth backs, the smooth backs of both sheets being adhered to each other and holding the chains between them, said chains extending beyond both ends of the device, and a handle secured to the chains at each end of the device.

JAMES McBREEN.

REFERENCES CITED

The following references are of record in the file of this patent:

UNITED STATES PATENTS

| Number | Name | Date |
| --- | --- | --- |
| 799,895 | Doughty | Sept. 19, 1905 |
| 1,232,075 | Oates | July 3, 1917 |
| 1,268,075 | Glynn | May 28, 1918 |
| 1,987,390 | Davis | Jan. 8, 1935 |

FOREIGN PATENTS

| Number | Country | Date |
| --- | --- | --- |
| 185 | Great Britain | Jan. 2, 1912 |